(12) United States Patent
Ten (10) Patent No.: US 7,057,624 B2
(45) Date of Patent: Jun. 6, 2006

(54) DISPLAY DEVICE LIGHT LEAKAGE COMPENSATION

(75) Inventor: Arkady Ten, Roseville, MN (US)

(73) Assignee: Eastman Kodak Company, Rochester, NY (US)

( * ) Notice: Subject to any disclaimer, the term of this patent is extended or adjusted under 35 U.S.C. 154(b) by 61 days.

(21) Appl. No.: 10/695,035

(22) Filed: Oct. 28, 2003

(65) Prior Publication Data

US 2005/0088453 A1    Apr. 28, 2005

(51) Int. Cl.
G09G 5/02 (2006.01)
(52) U.S. Cl. ............... 345/589; 345/590; 345/593; 345/594; 345/597; 345/601
(58) Field of Classification Search ............... 345/589, 345/590, 593, 594, 597, 601
See application file for complete search history.

(56) References Cited

U.S. PATENT DOCUMENTS

| | | | | |
|---|---|---|---|---|
| 6,111,650 | A * | 8/2000 | Rawicz et al. | 356/402 |
| 6,459,425 | B1 * | 10/2002 | Holub et al. | 345/207 |
| 6,559,826 | B1 * | 5/2003 | Mendelson et al. | 345/102 |
| 6,611,249 | B1 | 8/2003 | Evanicky et al. | |
| 6,717,625 | B1 * | 4/2004 | Thielemans | 348/745 |
| 6,853,387 | B1 * | 2/2005 | Evanicky et al. | 345/690 |
| 2002/0030776 | A1 * | 3/2002 | Khan et al. | 349/114 |
| 2002/0131634 | A1 * | 9/2002 | Weibrecht et al. | 382/162 |
| 2002/0171794 | A1 * | 11/2002 | Nakamura et al. | 349/117 |
| 2003/0156238 | A1 * | 8/2003 | Hiraishi et al. | 349/112 |
| 2003/0193511 | A1 * | 10/2003 | Ferguson | 345/604 |
| 2004/0141967 | A1 * | 7/2004 | van de Winkel | 424/144.1 |

FOREIGN PATENT DOCUMENTS

EP    0 539 943 A1    5/1993

OTHER PUBLICATIONS

Wu, S. and Yang, D., Reflective Liquid Crystal Displays. John Wiley & Sons Ltd., p. 35-37, 2001.
Berns, Roy S., et al. "Estimating Black-Level Emissions of Computer-Controlled Displays," Wiley Periodicals, Inc., vol. 28, No. 5, Oct. 2003.

(Continued)

Primary Examiner—Matthew C. Bella
Assistant Examiner—Mike Rahmjoo
(74) Attorney, Agent, or Firm—Mark G. Bocchetti (57) ABSTRACT

The invention relates to techniques for light leakage compensation in a multi-channel display device. The invention may be particularly useful in calculating single-channel emission spectra for liquid crystal displays (LCD). In order to accurately model and calibrate a display device, an accurate spectral output estimate for each of the individual color channels is needed. The invention provides techniques to compensate for light leakage from adjacent color channels that cause hue shifts in the images reconstructed by the display device. In accordance with the invention, a light leakage emission spectrum can be determined for each color channel of a display based on a measured emission spectrum for the display at a minimum level and assumed emission spectra for light sources in the display. A single-channel emission spectrum is the difference between a cumulative color channel emission spectrum measurement and the light leakage spectra of adjacent color channels.

20 Claims, 5 Drawing Sheets

OTHER PUBLICATIONS

U.S. Appl. No. 10/695,545, entitled "Display Device Color Channel Reconstruction," filed Oct. 28, 2003, by Arkady Ten.

Yasuhiro Yoshida and Yoichi Yamamoto, "Color Management of Liquid Crystal Display Placed under Light Envi ronment," XP-001144212, Electronics and Communications in Japan, Part 3, vol. 86, No. 7, 2003, 14 pgs.

Copy of European Search Report from EP Application No. 04024913.8-2217, dated Feb. 28, 2005, 5 pgs.

* cited by examiner

DISPLAY DEVICE LIGHT LEAKAGE COMPENSATION

TECHNICAL FIELD

The invention relates to color imaging and, more particularly, to presentation of color images on display devices.

BACKGROUND

Color display devices are typically multi-channel devices in the sense that multiple physical color channels represent every pixel on the display. Multi-channel display devices include cathode ray tubes (CRT), liquid crystal displays (LCD), plasma displays, and other imaging devices. One common example of a multi-channel device is a three channel device comprising red, green, and blue (RGB) channels.

Each of the color channels in a multi-channel display device may be modeled as a combination of a light source and a light valve. In the case of the LCD, the light source comprises a common backlight and color filters for each of the channels. The light valve, in the case of an LCD, typically comprises one or two fixed polarizers and liquid crystal cells (LCC), which rotate a polarization plane of passing light to regulate the amount of light emitted from the display.

An individual emission spectrum for each of the color channels is useful for spectral modeling and display calibration to improve color accuracy of imagery presented by the display. However, the emission spectrum for a single color channel cannot be accurately measured, because the emission spectrum measurement includes light leakage from adjacent color channels.

SUMMARY

In general, the invention relates to techniques for light leakage compensation in a multi-channel display device. The invention may be particularly useful in calculating single-channel emission spectra for liquid crystal displays (LCD). In order to accurately model and calibrate a display device, an accurate spectral output estimate for each of the individual color channels is needed.

The invention provides techniques to compensate for light leakage from adjacent color channels that cause hue shifts in the images reconstructed by the display device. In accordance with the invention, a light leakage emission spectrum can be determined for each color channel of a display based on a measured emission spectrum for the display at a minimum level and assumed emission spectra for light sources in the display. A single-channel emission spectrum is determined to be the difference between a cumulative color channel emission spectrum measurement and the light leakage spectra of adjacent color channels.

In one embodiment, the invention is directed to a method comprising measuring a cumulative emission spectrum for each of a plurality of color channels of a display with the respective color channel at a maximum level and the other color channels at minimum levels, measuring an emission spectrum of the display for a minimum display level, and assuming an emission spectrum for a light source for each of the color channels. The method further comprises calculating a light leakage spectrum for each of the respective color channels based on the measured emission spectrum for the minimum display level and the assumed emission spectra for the light sources, and calculating a single-channel emission spectrum for each of the respective color channels based on the measured cumulative emission spectrum and the calculated light leakage spectrum for the color channel.

In another embodiment, the invention is directed to a system that includes a display, a plurality of color channels in the display, a light source and a light valve to model each of the color channels, and means for driving the light valve based on a color profile defined by single-channel emission spectra, the single-channel emission spectra calculated from measured cumulative emission spectra and light leakage spectra for each of the color channels.

In a further embodiment, the invention is directed to a method in which a single-channel emission spectrum for each of a plurality of color channels of a display is determined based on a measured emission spectrum and a light leakage spectrum for the color channel.

In an added embodiment, the invention is directed to a computer-readable medium containing instructions. The instructions cause a programmable processor to receive a cumulative emission spectrum measurement for each of a plurality of color channels of a display with the respective color channel at a maximum level and the other channels at minimum levels, receive an emission spectrum measurement of the display for a minimum display level, and assume an emission spectrum for a light source for each of the color channels. The instructions further cause a processor to calculate a light leakage spectrum for each of the respective color channels based on the received emission spectrum for the minimum display level and the assumed emission spectra for the light sources, calculate a single-channel emission spectrum for each of the respective color channels based on the received cumulative emission spectrum and the calculated light leakage spectrum for the color channel, and drive a light valve in the display based on a color profile defined by the single-channel emission spectrum.

The invention is capable of providing many advantages. The described embodiments may improve color accuracy, and reduce color accuracy variation, for images presented by different types and brands of display devices. For example, a typical spectroradiometer measures a multi-channel spectral emission, because the measurement spot size is much larger than the size of a channel. The color channels cannot achieve a fully closed state, even at a minimum level. Therefore, the emission spectra measurements for each of the maximum level color channels include light leakage from adjacent color channels set at a minimum level. The single-channel emission spectra measurement accuracy may be improved by compensation of the light leakage. Such compensation allows for more accurate calibration of a display device color model and reduces non-physical effects in model calibration caused by contamination of the measurements by the light leakage. The capability of compensating light leakage to determine single-channel emission spectra adds flexibility to color applications and allows for less dependency on particular types and brands of display devices, such as LCDs, to present imagery with consistent color quality.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
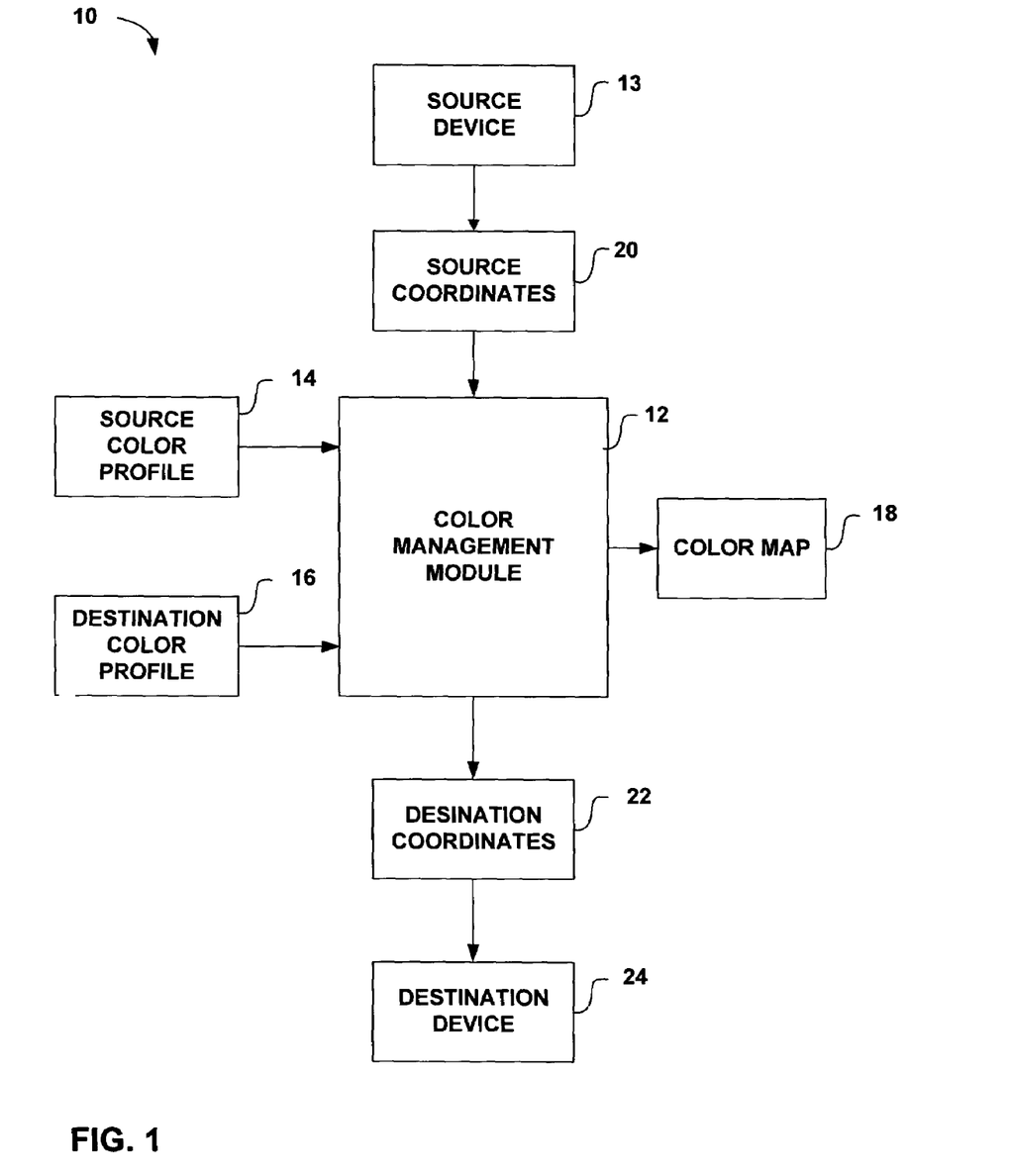
FIG. 1 is a block diagram illustrating a color management system that makes use of color profiles formulated for a display device in accordance with the invention.

FIG. 1 is a block diagram illustrating a color management system 10 that makes use of color profiles formulated for a display device in accordance with the invention. As will be described, the color profiles are built based on a display device color model that makes use of a single-channel emission spectrum generation for a multi-channel color display device that takes into account light leakage from adjacent color channels and wavelength dependent transmissions. The wavelength dependency causes hue shifts in the images reconstructed by the display device, as discussed in *Reflective Liquid Crystal Displays* by Wu S. and Yang D., John Wiley & Sons Ltd, p. 335, 2001. In this manner, the color profiles used by color management system 10 promote increased color image accuracy between images produced on different multi-channel color display devices.

As shown in FIG. 1, color management system 10 includes a color management module 12 that generates a color map 18 between a source device 13 and a destination device 24 based on a source color profile 14 and a destination color profile 16. Color map 18 defines a conversion between source coordinates 20 associated with source device 13 and destination coordinates 22 associated with destination device 24. Destination device 24 may be multi-channel color display devices including a liquid crystal display (LCD), a cathode ray tube (CRT) display, a plasma display, or the like. In some embodiments, source device 13 may be a color scanner device, a camera, or the like. An original image obtained by source device 13 is color corrected by color management module 12 using color map 18 prior to being displayed via destination display device 24. In another embodiment, color management module 12 may color correct an original image of a source device without generating a color map by using a combination of source and destination color profiles.

Color management module 12 may be realized by one or more software processes executing on a processor such as a desktop computer or workstation. Module 12 executes computer-readable instructions to support, at least in part, the functionality described herein. Color management module 12 facilitates color matching between destination device 24 and source device 13. Source color profile 14 specifies a set of color response characteristics associated with source device 13. Destination color profile 16 specifies a set of color response characteristics associated with destination device 24.

Source and destination color profiles 14, 16 permit reconciliation of color response differences between source device 13 and destination device 24 so that an image obtained by source device 13 can be accurately represented on destination device 24. Source and destination color profiles 14, 16 may generally conform to profiles specified by the International Color Consortium (ICC). Source coordinates 20 specify color image values for an image in a device-dependent coordinate system associated with source device 13, e.g., RGB in the event source device 13 is a scanner. Destination coordinates 22 specify color image values for an image in a device-dependent coordinate system associated with destination device 24.

Figure 2:
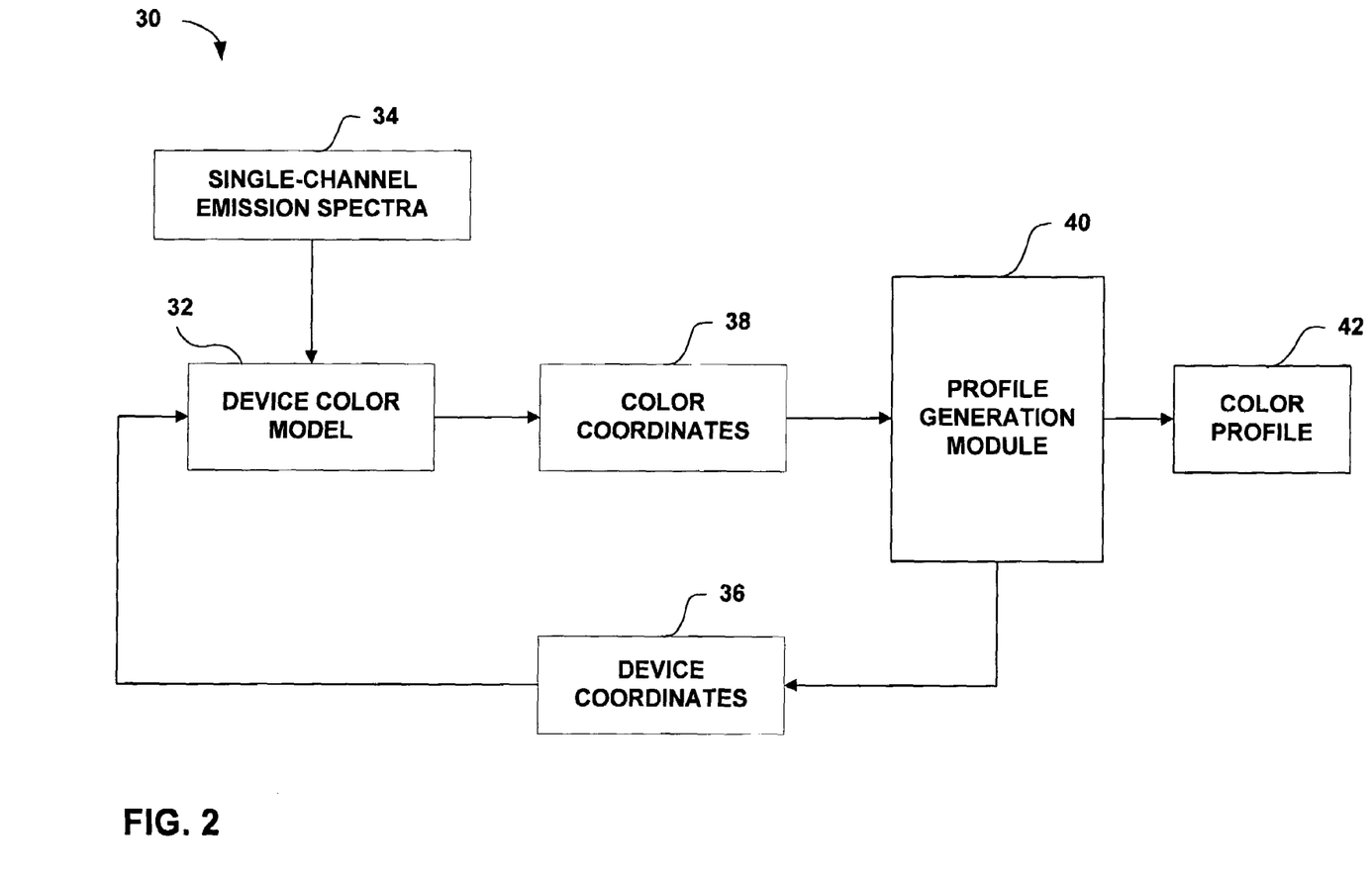
FIG. 2 is a block diagram illustrating a color profile generation system that generates a color profile based on a display device color model.

FIG. 2 is a block diagram illustrating a color profile generation system 30 according to an embodiment of the invention. Within system 30, a profile generation module 40 generates a color profile 42 based on data obtained from a display device such as destination display device 24. Profile generation module 40 may be realized by one or more software processes executing on a processor such as a desktop computer or workstation. The data obtained from the display device include single-channel emission spectra 34 and device coordinates 36, which are representative of the output characteristics of light sources and light valves, respectively, which form part of the display device. A device color model 32 uses single-channel emission spectra 34 and device coordinates 36 to generate color coordinates 38. Profile generation module 40 builds color profile 42 based on the relationship between device coordinates 36 sent to device color module 32 and color coordinates 38 generated by the device color model. In the case illustrated in FIG. 2, single-channel emission spectra 34 are included to improve calibration accuracy of device color model 32 and therefore improve accuracy of color coordinates 38 and color profile 42. In some embodiments, a device color model may not input single-channel emission spectra and instead generates color coordinates based only on device coordinates, e.g. RGB.

In other embodiments, a color profile may be built without a device color model; however, an accurate color profile in that scenario would typically require a significant number of measurements. Building and calibrating a device color model reduces the number of measurements needed to build a color profile as no additional measurements are needed after the device color model is calibrated. The device color model provides a response similar to a display device, but generates device-independent color coordinates.

Profile generation module 40 sends device coordinates 36 to device color model 32 and receives a modeled response in the form of color coordinates 38. Profile generation module 40 then creates color profile 42 that is capable of converting images from device-independent color coordinates to device specific coordinates. Profile generation module 40 may be configured to control device coordinates 36, and therefore the light valves in the display device to obtain color coordinates 38 from device color model 32, and generate color profile 42 based on the received data. As will be described, single-channel emission spectra 34 are calculated from equations based on measured and assumed spectral emissions of the display device.

The display device may comprise any number of color channels, but for purposes of illustration, will be described herein as a three-channel display system with a red channel, a green channel, and a blue channel (RGB). Each pixel of an exemplary display device, such as an LCD, includes three color channels that combine to generate the color needed to accurately reproduce a pixel of an image. Each of the color channels includes one of the light sources and one of the light valves that may be manipulated to achieve the color specified for the pixel. The light source emission spectrum $S_i(\lambda)$ of the $i^{th}$ channel is a function of the wavelength, $\lambda$, and determines the color of the channel. The light source comprises a combination of a backlight $B(\lambda)$ and a color filter $F_i(\lambda)$ for the $i^{th}$ color channel.

$$S_i(\lambda)=B(\lambda)*F_i(\lambda) \quad (1)$$

The light valve transmission spectrum $\phi(d,\lambda)$ is controlled by device coordinates 36 and may be assumed to be identical for every color channel. In a typical LCD device, stationary polarizers and liquid crystal cells (LCC) with controllable phase retardations constitute the light valves. A voltage applied to the LCC is dependent upon the digital driving signal d and determines the phase retardation for passing light. For polarized light, the phase retardation controls rotation of a polarization plane of the light and therefore, the wavelength dependent intensity of light transmitted through the light valves. An emission spectrum for an individual color channel i may be expressed as a product of the light source emission spectrum $S_i(\lambda)$ and the light valve transmission spectrum $\phi(d,\lambda)$.

$$E_i(d,\lambda)=S(\lambda)*\phi(d,\lambda) \quad (2)$$

A cumulative emission spectrum for a pixel is a summation of all N individual color channels, in this case the red, green, and blue color channels.

$$E(d_r, d_g, d_b, \lambda) = \sum_{i=1}^{N} E_i$$
$$= S_r(\lambda)*\phi(d_r, \lambda) + S_g(\lambda)*\phi(d_g, \lambda) + S_b(\lambda)*\phi(d_b, \lambda) \quad (3)$$

The light sources determine the color of light emitted for each of the color channels. The digital driving signal d controls the intensity of light transmitted by the light valves for each of the color channels.

Figure 3:
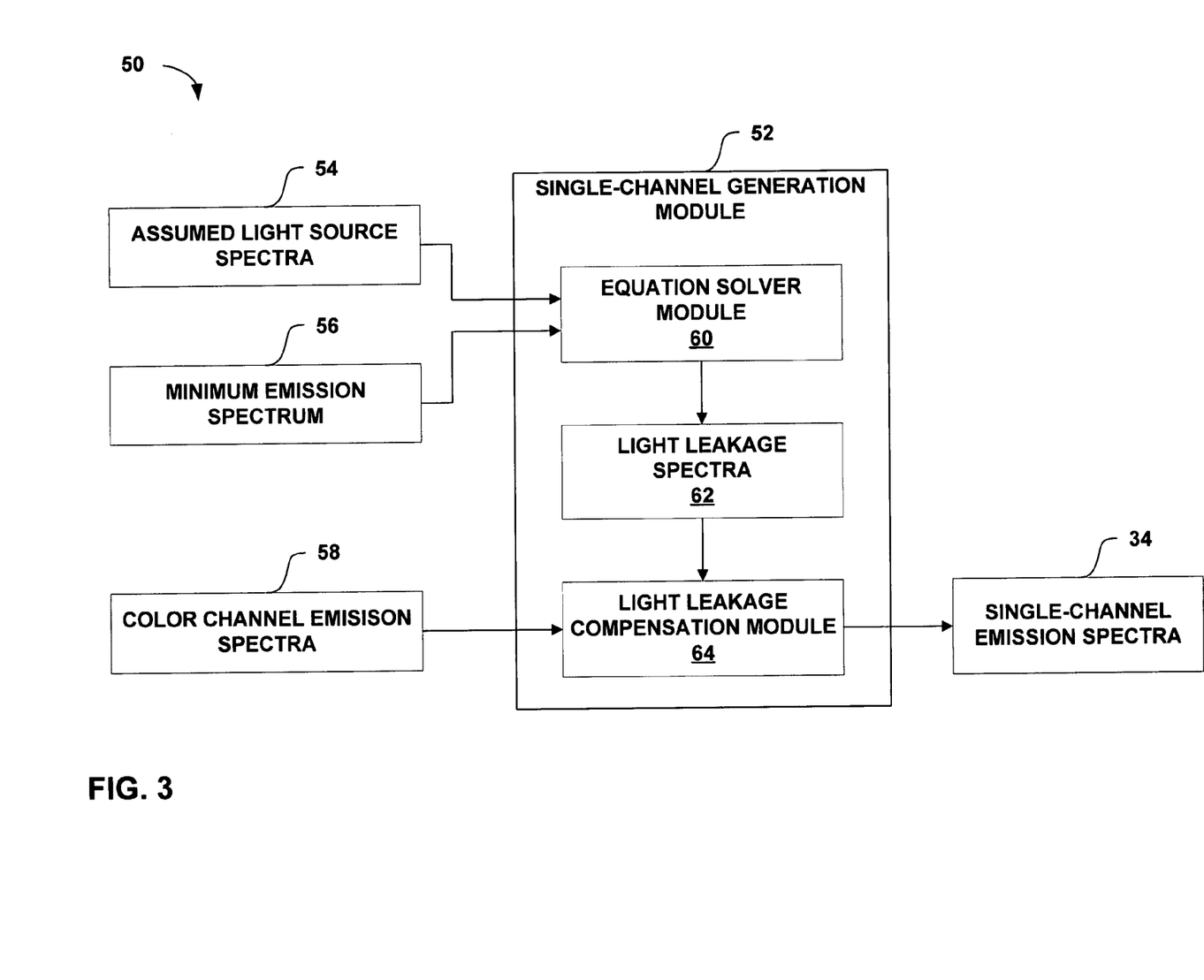
FIG. 3 is a block diagram illustrating a single-channel generation system that compensates light leakage in display device spectral emission measurements to generate single-channel emission spectra.

In accordance with the invention, profile generation module 40 generates color profile 42 for the LCD based on color coordinates 38, which are determined by device color model 32 from single-channel emission spectra 34 and device coordinates 36. The resulting color profile 42 represents the color response characteristics of the LCD device. In order to generate color profile 42 for any type or brand of LCD, single-channel emission spectra 34 must be determined from display measurements and calculations. Advantageously, the calculations compensate for adjacent channel leakage and light valve wavelength dependency that create inaccuracies in direct single-channel spectral measurements. The light-leakage compensated single-channel emission spectra 34 improve calibration of device color model 32 and therefore create a more accurate color profile 42 for the display device FIG. 3 is a block diagram illustrating a single-channel generation system 50 that compensates light leakage in display device spectral emission measurements to generate single-channel emission spectra 34 useful in system 30 of FIG. 2. In the example of FIG. 3, the spectral emission measurements are from the three-channel LCD described above. System 50 includes assumed light source spectra 54, a minimum emission spectrum 56, and color channel emission spectra 58 input to a single-channel generation module 52. Single-channel generation module 52 includes an equation solver module 60, light leakage spectra 62 and a light leakage compensation module 64. Light leakage compensation module 64 generates single-channel emission spectra 34 based on color channel emission spectra 58 and light leakage spectra 62. In particular, single-channel emission spectra 34 are determined by subtracting light leakage spectra 62 from color channel emission spectra 58 for each of the color channels. Single-channel emission spectra 34 may improve calibration of display device color model 36 from FIG. 2, and therefore improve color accuracy of the LCD.

In conventional color calibration techniques, a minimum display level emission spectrum is assumed to be the light leakage spectrum for all of the color channels. In that case, the difference between color channel emission spectra and the minimum emission spectrum determines single-channel emission spectra. However, the minimum emission spectrum typically overcompensates for light leakage, so the display emission predictions remain inaccurate. The inaccuracy may cause a noticeable hue shift in perceived color.

In the system illustrated in FIG. 3, light leakage spectra 62 are generated based on assumed light source emission spectra 54 and the minimum display level emission spectrum 56. In particular, light leakage spectra 62 are determined by solving equations based on assumed light source emission spectra 54 and measured minimum emission spectrum 56. Minimum emission spectrum 56 comprises an emission measurement of all the red, green and blue color channels operating at the minimum digital driving signal.

$$\hat{E}(0,0,0,\lambda)=(S_r(\lambda)+S_g(\lambda)+S_b(\lambda))*\phi(0,\lambda) \quad (4)$$

Single-channel generation module 52 applies assumed light source emission spectra 54 and minimum emission spectrum 56 to equation solver module 60. Equation solver module 60 calculates light leakage spectra 62 for each of the color channels in the display. A general light leakage spectrum may be represented as:

$$W_m(\lambda) = \left(1 - \frac{S_m(\lambda)}{\sum_i S_i(\lambda)}\right) * \hat{E}(0, 0, 0, \lambda) \quad (5)$$

for a channel m in a device with any number of channels i. In the example of FIG. 3, the LCD device comprises the red, green, and blue color channels with respective light leakage spectra.

$$W_r(\lambda) = \left(1 - \frac{S_r(\lambda)}{(S_r(\lambda) + S_g(\lambda) + S_b(\lambda))}\right) * \hat{E}(0, 0, 0, \lambda) \quad (6)$$
$$W_g(\lambda) = \left(1 - \frac{S_g(\lambda)}{(S_r(\lambda) + S_g(\lambda) + S_b(\lambda))}\right) * \hat{E}(0, 0, 0, \lambda)$$
$$W_b(\lambda) = \left(1 - \frac{S_b(\lambda)}{(S_r(\lambda) + S_g(\lambda) + S_b(\lambda))}\right) * \hat{E}(0, 0, 0, \lambda)$$

Light leakage compensation module 64 generates single-channel emission spectra 34 based on the difference between color channel emission spectra 58 and light leakage spectra 62 for each of the color channels.

The measured emission spectra of the display for the red, green, and blue channels are included in color channel emission spectra 58. Color channel emission spectra 58 comprise cumulative emission measurements of each color channel with the respective color channel at a maximum level and the other channels at minimum levels. For example, the red channel emission spectrum comprises the cumulative emission measurement of the display when the red channel is at the maximum digital driving signal and the green channel and blue channel are at the minimum digital driving signal. The green channel and blue channel minimum level emissions should not be assumed to be negligible, however, and can generate significant emission even when the pertinent light valves are turned "off." In particular, the minimum level light valve transmission spectrum $\phi(0,\lambda)$ is still dependent on wavelength. Consequently, the light valves typically do not fully close to block all light from being emitted. The resulting emissions for the red $(255,0,0,\lambda)$, green $(0,255,0,\lambda)$ and blue $(0,0,255,\lambda)$ channels, at maximum 8-bit (255) drive levels with adjacent channels at minimum drive levels, are represented as follows:

$$\hat{E}(255,0,0,\lambda)=S_r(\lambda)*\phi(255,\lambda)+S_g(\lambda)*\phi(0,\lambda)+S_b(\lambda)*\phi(0,\lambda)$$

$$\hat{E}(0,255,0,\lambda)=S_r(\lambda)*\phi(0,\lambda)+S_g(\lambda)*\phi(255,\lambda)+S_b(\lambda)*\phi(0,\lambda)$$

$$\hat{E}(0,0,255,\lambda)=S_r(\lambda)*\phi(0,\lambda)+S_g(\lambda)*\phi(0,\lambda)+S_b(\lambda)*\phi(255,\lambda) \quad (7)$$

where E is emission, S is the spectral contribution of light source, and $\phi(255,\lambda)$ is the digital driving value for a given light valve. Although 8-bit drive levels are illustrated for purposes of example, other n-bit drive levels may be used.

Equation solver module 60 outputs light leakage spectra 62, from equations (6), to light leakage compensation module 64. Compensation module 64 inputs color channel emission spectra 58 and light leakage spectra 62. Compensation module 64 calculates the difference between color channel emission spectra 58 and light leakage spectra 62. The output of compensation module 64 is single-channel emission spectra 34. Single-channel emission spectra 34 include an emission spectrum for each of the single color channels in the display.

$$E_r(d_r,\lambda)=\hat{E}(d_r,0,0,\lambda)-W_r(\lambda)$$

$$E_g(d_g,\lambda)=\hat{E}(0,d_g,0,\lambda)-W_g(\lambda)$$

$$E_b(d_b,\lambda)=\hat{E}(0,0,d_b,\lambda)-W_b(\lambda) \quad (8)$$

Single-channel emission spectra 34 improve calibration accuracy of device color model 32 to accurately model the display device and generate color profile 42, as shown in FIG. 2. System 50 improves the color accuracy of the multi-channel LCD by compensating light leakage contamination in single-channel emission measurements. Again, the value d in equation (8) represents an applicable drive level.

As an example, a display emission prediction can be represented by an equation. As seen from equation (3) described in reference to FIG. 2, the cumulative emission spectrum is a summation of the emission spectra for all the color channels. Equation (3) may be rewritten as:

$$E(d_r,d_g,d_b,\lambda)=E_r(d_r,\lambda)+E_g(d_g,\lambda)+E_b(d_b,\lambda) \quad (9)$$

Equation (7), described above, shows that each color channel emission spectrum measurement comprises the respective color channel at a level d, and the adjacent color channels at the minimum level, 0.

$$\hat{E}(d_r,0,0,\lambda)=E_r(d_r,\lambda)+E_g(0,\lambda)+E_b(0,\lambda)$$

$$\hat{E}(0,d_g,0,\lambda)=E_r(0,\lambda)+E_g(d_g,\lambda)+E_b(0,\lambda)$$

$$\hat{E}(0,0,d_r,\lambda)=E_r(0,\lambda)+E_g(0,\lambda)+E_b(d_b,\lambda) \quad (10)$$

Summing the equations (10) determines the cumulative emission spectrum for all the channels at the level d, as follows:

$$E_{(d_r,d_g,d_b,\lambda)}=E_r(d_r,\lambda)+E_g(d_g,\lambda)+E_b(d_b,\lambda)+2*(E_r(0,\lambda)+E_g(0,\lambda)+E_b(0,\lambda)) \quad (11)$$

The difference between equation (11) and equation (9) is a doubled black level emission. A noticeable shift in color results from the discrepancy between the conventional spectral prediction (9) and the measured emission spectrum (11).

Figure 4:
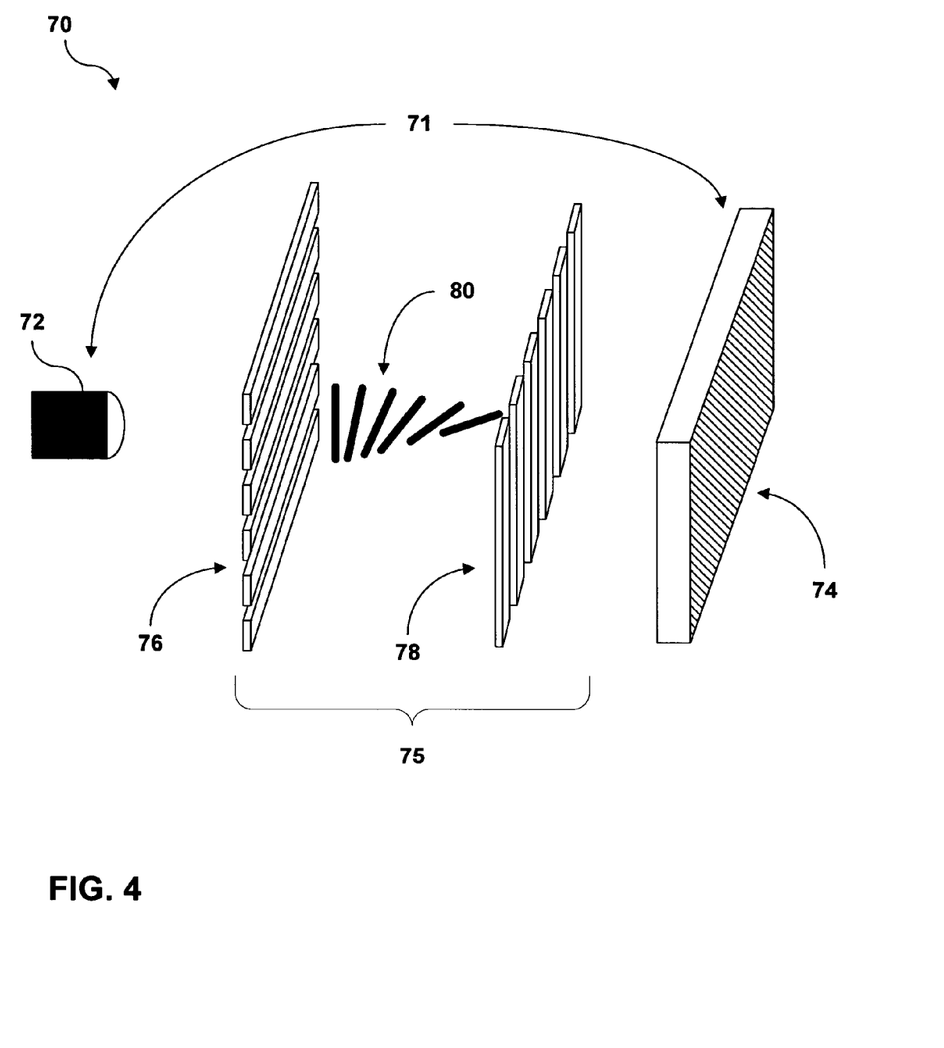
FIG. 4 is a schematic diagram illustrating a color channel of a multi-channel liquid crystal display (LCD) device as a portion of the single-channel generation system from FIG. 3.

FIG. 4 is a schematic diagram illustrating a color channel 70 of a typical liquid crystal display (LCD) device as a portion of single-channel generation system 50, from FIG. 3. Color channel 70 includes a light source 71 and a light valve 75. Light source 71 includes a backlight 72 and a color filter 74. Light valve 75 includes a first polarizer 76, a second polarizer 78, and liquid crystal cells (LCC) 80 disposed between the polarizers 76 and 78.

Backlight 72 emits light to every pixel, and therefore every color channel 70. First polarizer 76 of light valve 75 polarizes the passing light from backlight 72. LCC 80 rotates the polarization plane of the passing light. The amount of light transmitted by light valve 75 depends on an orientation of the polarization plane of the passing light relative to second polarizer 78. An angle of rotation of the polarization plane depends on a voltage or digital driving signal applied to LCC 80 and a wavelength of the light. Color filter 74 filters the light transmitted by light valve 75 to define the color of channel 70. In the case of the three-channel LCD described above, color filter 84 may be a red, green, or blue filter.

Single-channel generation system 50, from FIG. 3, may improve the color accuracy of images displayed by the LCD. System 50 uses display emission measurements to create and calibrate display device color model 32, which is then used to create color profile 42 for the display. Color profile 42 drives light valve 75, e.g., from a host computer coupled to a destination display device, to generate a precise color output from color channel 70 and the LCD. Display device emission may vary between types and brands of displays. The color profile 42 built by color profile generation system 30 from FIG. 2 may allow any LCD device to more accurately present the intended color of an image obtained by a source device.

Figure 5:
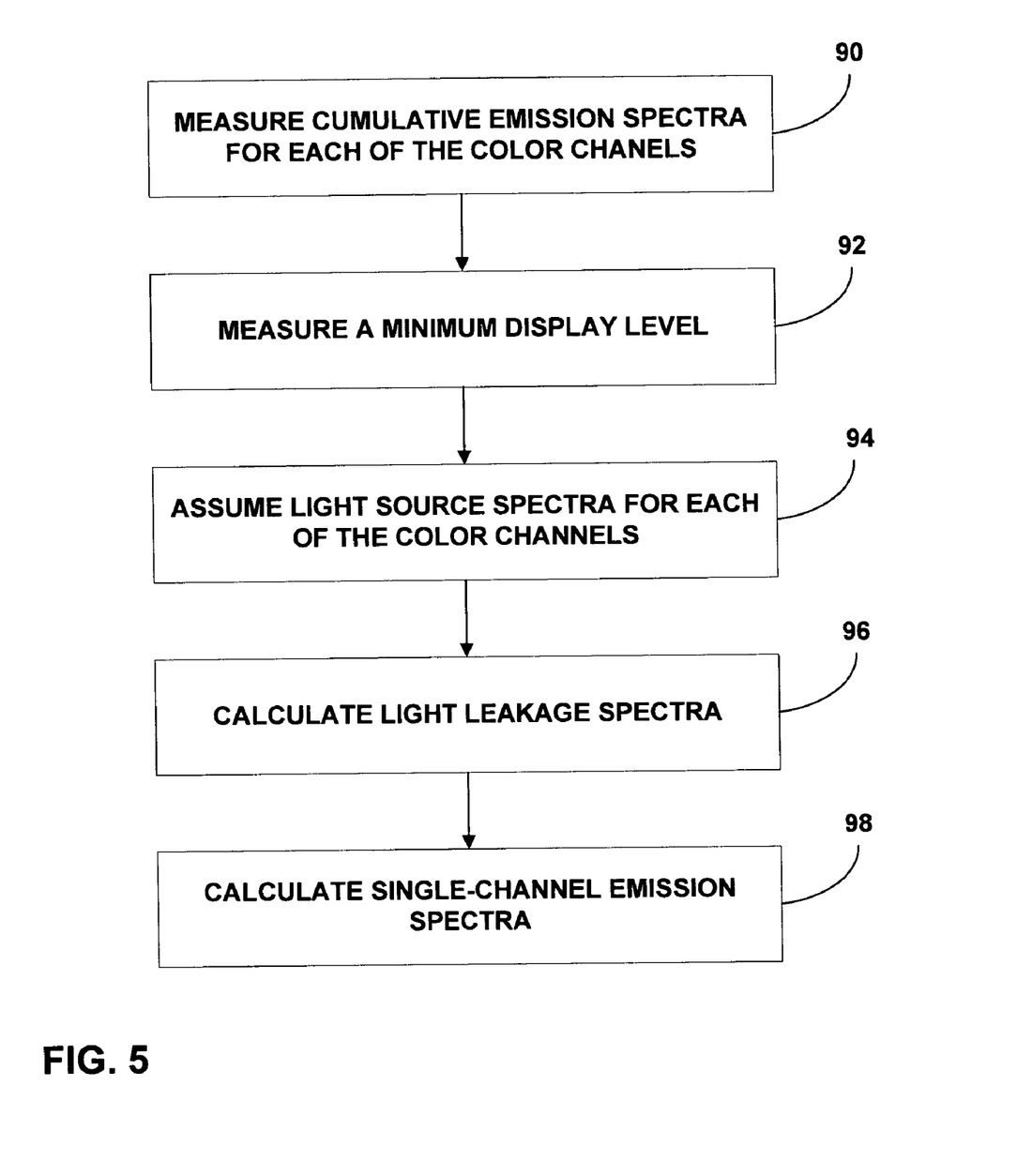
FIG. 5 is a flow chart illustrating a method to determine single-channel emission spectra of a multi-channel LCD device.

FIG. 5 is a flow chart illustrating a method to determine single-channel emission spectra 34 of a multi-channel liquid crystal display. The single-channel emission spectra 34 may be used to create and calibrate device color model 32. Device color model 32 may model the LCD and generate color coordinates 38 used to build color profile 42 for the LCD. Measurements and assumptions from the display device generate single-channel emission spectra 34. Color channel emission spectra 58 are measured for each of the color channels 70 of the LCD with the respective channel at a maximum level and the other channels at minimum levels (90). An emission spectrum is measured for all the color channels 70 of the display operating at the minimum level (92), which may be considered a black emission. Emission spectra for light sources 71 are assumed to be known (94). The assumed light source emission spectra 54 may be determined by a light source reconstruction method based on color channel emission spectra 58, an assumed maximum level transmission spectrum for one of light valves 75, and an inverted display contrast ratio. Techniques for light source reconstruction are also disclosed in copending and commonly assigned U.S. patent application Ser. No. 10/695,545, titled "DISPLAY DEVICE COLOR CHANNEL RECONSTRUCTION," to Arkady Ten, filed Oct. 28, 2003, the entire content of which is incorporated herein by reference.

Minimum emission spectrum 56 and assumed light source emission spectra 54 are used by equation solver module 60 in single-channel generation module 52 to calculate light leakage spectra 62 for each of the color channels 70 (96). Light leakage spectra 62 and color channel emission spectra 58 are input to light leakage compensation module 64. The single-channel emission spectra 34 are determined by compensation module 64 by subtracting light leakage spectra 62 from color channel emission spectra 58 for each of the color channels 70 (98).

Single-channel emission spectra 34 are used to accurately predict spectral output of the LCD. The single-channel emission spectra cannot be measured directly because modern spectroradiometers have a measurement spot size of approximately 1 cm, which includes hundreds of channels that continue to emit light even in a fully closed state. Therefore, the described method generates the single-channel spectral prediction needed to accurately model and calibrate the display device color model 32. Calibration of the device color model 32 by the single-channel emission spectra generated by the method illustrated in FIG. 5 results in a difference of $\Delta E=0.27$ between the light leakage corrected spectra 34 and the measured emission spectra represented by equation (11), described in reference to FIG. 3. The light leakage compensation method far surpasses the shift of $\Delta E=3.75$ experienced when no light leakage method is applied to the color channel emission spectra 58.

Various embodiments of the invention have been described. These and other embodiments are within the scope of the following claims.

The invention claimed is:

1. A method comprising:
measuring a cumulative emission spectrum for each of a plurality of color channels of a display with the respective color channel operating at a maximum level and other color channels operating at minimum levels;
measuring an emission spectrum of the display for a minimum display level;
assuming light source emission spectra for light sources associated with the color channels;
calculating a light leakage spectrum for each of the color channels based on the measured emission spectrum for the display and the assumed light source emission spectra for the light sources associated with the respective color channels; and
calculating a single-channel emission spectrum for each of the color channels based on the measured cumulative emission spectrum and the calculated light leakage spectrum for the respective color channel.

2. The method of claim 1, wherein the cumulative emission spectrum of the display comprises a summation of emission spectra for all of the color channels.

3. The method of claim 2, wherein the emission spectrum for each of the color channels combines the light source emission spectrum for a light source associated with the respective color channel and a transmission spectrum for a light valve in the display.

4. The method of claim 3, wherein the transmission spectrum is dependent upon a digital driving signal and a wavelength of the light source.

5. The method of claim 1, wherein assuming the emission spectra for the light sources comprises using a color channel reconstruction method.

6. The method of claim 5, wherein the color channel reconstruction method comprises determining the light source emission spectrum for each of the color channels based on the measured emission spectra for the color channels, an inverted contrast ratio for the display, and an assumed transmission spectrum for a light valve in the display.

7. The method of claim 1, wherein, at the minimum display level, all of the channels operate at minimum levels in response to minimum digital driving signals to generate a black display.

8. The method of claim 1, wherein the plurality of color channels comprises a red channel, a green channel, and a blue channel.

9. The method of claim 1, wherein the display comprises a liquid crystal display (LCD).

10. A method for determining hue shifts in images resulting from light leakage from adjacent color channels in images reconstructed by a multi-channel display device comprising:
measuring a cumulative channel emission spectrum for each of a plurality of color channels of the multi-channel display device;
determining a light leakage spectrum for each of the plurality of color channels of the multi-channel display device; and
determining a single-channel emission spectrum for each of a plurality of color channels of a display by calculating the difference between the cumulative channel emission spectrum and the light leakage spectrum for each of the plurality of color channels of the multi-channel display device.

11. The method of claim 10, further comprising calculating the light leakage spectrum based on a measured emission spectrum for the display operating at a minimum level and assumed emission spectra for light sources within the display.

12. The method of claim 11, further comprising assuming the emission spectra for the light sources using a color channel reconstruction method.

13. The method of claim 12, wherein the color channel reconstruction method comprises determining a light source emission spectrum for each of the color channels based on measured emission spectra for the color channels, an inverted contrast ratio for the display, and an assumed transmission spectrum for a light valve in the display.

14. The method of claim 10, wherein the measured emission spectrum for the respective one of the color channels is measured with the respective one of the color channels operating at a maximum level and other ones of the color channels operating at minimum levels.

15. The method of claim 10, wherein the plurality of color channels comprises a red channel, a green channel, and a blue channel.

16. The method of claim 10, wherein the display comprises a liquid crystal display (LCD).

17. A computer-readable medium comprising instructions for causing a programmable processor to:
receive a cumulative emission spectrum for each of a plurality of color channels of a display with a respective color channel operating at a maximum level, and other color channels operating at minimum levels;

receive an emission spectrum of the display for a minimum display level;

assume light source emission spectra for light sources associated with the color channels;

calculate a light leakage spectrum for each of the color channels based on the measured emission spectrum for the display and the assumed light source emission spectra for the light sources associated with the respective color channel;

calculate a single-channel emission spectrum for each of the color channels based on the measured cumulative emission spectrum and the calculated light leakage spectrum for the respective the color channel; and drive a light valve in the display based on a color profile defined by the single-channel emission spectrum.

18. The computer-readable medium of claim 17, further comprising instructions to cause the processor to assume the light source emission spectra for the light sources using a color channel reconstruction method.

19. The computer-readable medium of claim 18, wherein the color channel reconstruction method comprises determining the light source emission spectrum for each of the color channels based on the received emission spectra for the color channels, an inverted contrast ratio for the display, and an assumed transmission spectrum for the light valve.

20. The computer-readable medium of claim 18, wherein the light valve is driven by a digital driving signal based on the color profile.

* * * * *